United States Patent [19]

Williams

[11] Patent Number: 5,015,690

[45] Date of Patent: May 14, 1991

[54] THERMOPLASTIC MODIFIER COMPOSITIONS WHICH IMPARTS IMPROVED APPEARANCE AND IMPACT PROPERTIES TO MOLDED THERMOPLASTICS

[75] Inventor: William G. Williams, Baton Rouge, La.

[73] Assignee: Copolymer Rubber & Chemical Corporation, Baton Rouge, La.

[21] Appl. No.: 316,877

[22] Filed: Feb. 28, 1989

Related U.S. Application Data

[63] Continuation-in-part of Ser. No. 37,416, Apr. 13, 1987, abandoned.

[51] Int. Cl.$^5$ ............................................. C08G 81/02
[52] U.S. Cl. ...................................... 525/73; 525/64; 525/66; 525/67; 525/68; 525/74
[58] Field of Search ...................................... 525/73, 74

[56] References Cited

U.S. PATENT DOCUMENTS 4,172,859 10/1979 Epstein ............................... 428/402
4,315,084  2/1982 Cooper ................................. 525/69
4,590,241  5/1986 Hohlfeld ............................. 525/132
4,612,347  9/1986 Eichenauer .......................... 525/73
4,886,856 12/1989 Chen ................................... 525/73

Primary Examiner—Patricia Short
Attorney, Agent, or Firm—Rockey and Rifkin

[57] ABSTRACT

A modifier composition which provides retention of surface smoothness and internal appearance while imparting improved low-temperature impact properties to molded thermoplastics and the thermoplastic molding compositions containing said modifier, the modifier comprising a crystalline thermoplastic resin and a modifier formed by combining a grafted EPM or EPDM rubber and a reactive polystyrene.

13 Claims, No Drawings

THERMOPLASTIC MODIFIER COMPOSITIONS WHICH IMPARTS IMPROVED APPEARANCE AND IMPACT PROPERTIES TO MOLDED THERMOPLASTICS

CROSS-REFERENCE TO RELATED APPLICATIONS

This is a continuation-in-part of copending application Ser. No. 037,416, filed Apr. 13, 1987 now abandoned.

This invention relates to modifiers for thermoplastic resins and it relates more particularly to low-temperature impact modifiers of the type described which enable retention of surface smoothness and appearance of the thermoplastic resins with which such modifiers are blended or otherwise incorporated.

BACKGROUND OF THE INVENTION

Common thermoplastic resins, i.e., polycarbonates, polyesters, polyphenylene ethers, polyamides, polystyrenes, acrylics and the like have excellent combinations of properties making them suitable for use as molded articles. Such resins, in general, show good elongation, good tensile strength and good impact, among other properties. However, it is widely recognized that such resins are notch sensitive and subject to brittle failure upon impact due to poor resistance to crack propagation. This flaw in an otherwise excellent spectrum of physical properties greatly restricts the usefulness of articles molded from such resins.

Improving the notch sensitivity and preventing brittle failure upon impact of thermoplastic resins has been the subject matter of considerable research and development. Generally, the problem is addressed by the addition or admixture of additives to the thermoplastic resin which improve notch sensitivity without substantially affecting other properties. The most common type of such additives are rubber-like or elastomeric materials, such as ethylene-propylene copolymers (EPM), or ethylene-propylenepolyene terpolymers (EPDM), which form discrete particles dispersed throughout the thermoplastic resin. However, the desired level of improvement when achieved with the addition of such rubber-like or elastomeric materials results in deterioration of surface and internal appearance commonly achieved with the matrix resin by reason of the relative incompatibility between such rubber-like or elastomeric materials and many thermoplastic resins. This leads to an impact modified thermoplastic composition not suitable for many normal end uses of the matrix resin.

Attempts have been made to overcome this problem and increase the compatibility between the rubber-like or elastomeric materials and thermoplastic resins by modification of the rubber-like or elastomeric materials to provide such with sites that adhere to the thermoplastic resin and thus increase compatibility.

Cope, U.S. Pat. No. 3,435,093, discloses blends of polyethylene terephthalate and an ionic hydrocarbon copolymer of alpha-olefins of the formula $R-CH=CH_2$ in which R is hydrogen (ethylene) or an alkyl radical of 1-3 carbon atoms (propylenepentene) with the copolymer modified with an alpha-beta ethylenically unsaturated carboxylic acid containing 3-5 carbon atoms. The Cope patent does not teach or suggest the components of the additive employed in the practice of the invention described and claimed herein, as will hereinafter appear.

The problem of improved toughness or ductility was faced directly in the Epstein U.S. Pat. Nos. 4,172,859 and 4,174,358. The Epstein patents are somewhat confusing in that they seek to cover the waterfront by listing an endless number of materials and combinations thereof for use as additives to improve the toughness and impact strength of polyamide, polyester and polycarbonate resins. In the Epstein patents, stress is placed on the particle size and tensile modulus of the copolymer additive. While Epstein contemplates the use of ethylene-propylene copolymers and ethylene-propylene-polyene terpolymers from amongst the large number of other varieties of materials and the use of alpha-beta ethylenically unsaturated carboxylic and dicarboxylic acids and anhydrides as modifying agents to provide sites which adhere to the matrix resin, the Epstein patents do not recognize the concepts of the invention described and claimed herein, as will hereinafter be pointed out.

In copending application Serial No. 690,613, of which this is an improvement, the invention described therein is based on the thought that an ethylene, $C_3-C_{16}$ mono-olefin, polyene and preferably and ethylene, propylene, diene rubbery interpolymer would make a good impact modifier for such thermoplastic polyester, polyamide, polycarbonate resins if the two could be made compatible. The two are relatively incompatible because the rubber is a hydrocarbon while the thermoplastic or polyester is a much more polar substance. Thus, the objective of the invention described and claimed therein was addressed to the modification of the ethylene, mono-olefin, polyene interpolymer rubber greatly to improve its compatibility with polyester to provide an improved impact modifier for the thermoplastic polyester resin, while maintaining excellent internal and external appearance of the final molded material.

Briefly described, the features of the invention of the copending application are embodied in a composition comprising 60-90 percent by weight of the matrix thermoplastic resin such as in the form of a polyester blended with 10-40 percent by weight of an unsaturated rubber formed by copolymerization of ethylene, one or more mono-olefins and one or more polyenes in which the backbone unsaturated rubber component has been modified with an ester of an alpha-beta unsaturated acid having an epoxide functionality on the alkoxy portion, such as the ester derived from methacrylic acid and an epoxy alcohol and which attaches to the backbone rubber chiefly by way of a grafting reaction with little if any cross-linking reaction.

Copending Phadke application Ser. No. 800,332, filed Nov. 21, 1985, describes an improvement over the invention described and claimed in the aforementioned copending application Ser. No. 690,613, in that controlled cross-linking of the rubber backbone phase (EPDM) of the grafted modifier provides a significant improvement in the knitline strength of the final blend with the matrix (polyester, polycarbonate or polyamide) resin, when the cross-linking reaction is carried out after proper dispersion of the grafted rubber phase in the plastic matrix resin and when the cross-linking is concentrated between the rubber phase of the grafted rubber. For this purpose, use is made of a cross-linking agent in the form of a compound having functionalities capable of reaction with the grafted rubber, such as diacids or corresponding dianhydrides and/or diamines such as hexamethylene diamine (HDA), melamine, benzophenone tetracarboxylic dianhydride, adipic acid, maleic acid, maleic anhydride and the like.

While the desired improvements in impact strength, toughness and knitline strength have been achieved by blending a described thermoplastic matrix resin with modifiers of the types described in the aforementioned copending applications, the final products formed thereof, as by molding and the like, could be further improved from the standpoint of internal appearance and surface characteristics.

BRIEF DESCRIPTION OF THE INVENTION

It has been found, in accordance with the practice of this invention, that the internal appearance and the surface characteristics of the products fabricated of the compositions of the above-mentioned applications are improved, when, in addition to the grafted EPM or EPDM rubber, the modifier for the matrix resin includes an activated polystyrene, such as marketed by the Dow Chemical Company of Midland, Mich., under the name REACTIVE POLYSTYRENE (RPS). The reactive polystyrene component can be combined with the grafted rubber for subsequent blending with the matrix resin or it can be added as a component separate and apart from the grafted rubber for blending or combining with the matrix resin.

More specifically, the modifier compositions embodying the features of this invention comprise 25-90 parts by weight of an EPM or EPDM rubber grafted with an alpha-beta unsaturated dicarboxylic acid or anhydride or an epoxy functional alpha-beta ethylenically unsaturated hydrocarbon and 10-75 parts by weight of a reactive polystyrene. The thermoplastic molding composition of this invention thus contains 45-90 parts by weight of the matrix resin and 55-10 parts by weight of the modifier as described above.

The matrix resins that are noticeably benefitted by the practice of this invention include the thermoplastic resins, such as polycarbonates, polyphenylene ethers, acrylics and polystyrenes, while improvements can be observed in such other matrix resins as polyamides and polyester resins. As described in the above-mentioned copending applications, the grafted rubbers comprise EPM rubbers, formed by copolymerization of ethylene with one or more $C_3$-$C_{16}$ mono-olefins and preferably propylene, grafted with an alpha-beta unsaturated dicarboxylic acid such as maleic acid, maleic anhydride or the like described in the aforementioned copending applications and as more specifically described in the copending application of Olivier, Ser. No. 537,789, included herein by reference, or an EPDM rubber grafted with an unsaturated dicarboxylic acid of the type heretofore described and preferably, an alpha-beta ethylenically unsaturated hydrocarbon, preferably having an epoxide functionality, as described in the aforementioned copending applications Ser. No. 800,332 and Ser. No. 690,613.

As the EPM rubber, use can be made of an ethylene-monoolefin and preferably an ethylene-propylene copolymer rubber formed by copolymerization in solvent solution, in the presence of a Ziegler-type catalyst, of ethylene and one or more monoolefins, preferably propylene, but which may include 1-butene, 1-pentene, or other mono-olefins having 3-12 carbon atoms. The ratio of ethylene to propylene or $C_3$-$C_{12}$ mono-olefin may range from 10-95 moles of ethylene to 90-5 moles of propylene or other mono-olefins. The preferred range of ethylene to propylene or other mono-olefin is 45-75 moles of ethylene to 55-25 moles of propylene or other mono-olefin.

The solvent medium in which the copolymerization reaction is carried out may be any suitable inert organic solvent that is liquid under reaction conditions and it may be a prior art solvent for solution polymerization of mono-olefin in the presence of a Ziegler-type catalyst. Examples of satisfactory hydrocarbon solvents include straight chain paraffins having from 5-8 carbon atoms, with best results often being secured by the use of hexane; aromatic hydrocarbons and preferably an aromatic hydrocarbon having a single benzene nucleus, such as benzene, toluene and the like; and saturated cyclic hydrocarbons having boiling point ranges approximating those of the straight chain paraffin hydrocarbons and aromatic hydrocarbons described above, and preferably saturated cyclic hydrocarbons having 5-6 carbon atoms in the ring nucleus. The solvent selected may be a mixture of one or more of the foregoing hydrocarbons and preferably a mixture of aliphatic an napthenic hydrocarbons having approximately the same boiling range as normal hexane. It is desirable that the solvent be dry and free of substances that will interfere with the Ziegler-type catalyst used in the polymerization reaction.

Ziegler catalysts of the type well known to the prior art may be used. Such Ziegler-type catalysts are disclosed in a large number of patents, such as U.S. Pat. Nos. 2,993,480, 3,093,620, 3,093,621, 3,211,709 and 3,113,115. Examples of Ziegler catalysts include metal organic coordination catalysts prepared by contacting a compound of a heavy metal of the group IV-a, V-a, VI-a and VII-a of the Mendeleeff period system of elements, such as titanium, vanadium and chromium halides with an organo-metallic compound of a metal of Groups I, II or III of the Mendeleeff period system which contains at least one carbon-metal bond, such as trialkyl aluminum, and alkyl aluminum halides in which the alkyl groups contain from 1-20 and preferably 1-4 carbon atoms.

The preferred Ziegler catalyst for interpolymerization is prepared from a vanadium compound and an alkyl aluminum halide. Examples of suitable vanadium compounds include vanadium trichloride, vanadium tetrachloride, vanadium oxychloride, vanadium acetyl acetonate, etc. Activators which are especially preferred include alkyl aluminum chlorides of U.S. Pat. No. 3,113,115, general formula $R_1AlCl_2$ and $R_2AlCl$ and the corresponding sesquichlorides of the general formula $R_3Al_2Cl_3$, in which R is methyl, ethyl, propyl, butyl or isobutyl. In the catalyst system, the aluminum to vanadium mole ratio of the aluminum and vanadium compounds may be within the range of 5/1 to 200/1 and preferably within the range of 15/1 to 60/1, with best results being secured in the ratio of 40 aluminum to 1 vanadium. These same ratios apply with respect to corresponding compounds of others of the heavy metals substituted for the vanadium compound and the organometallic compounds of groups I, II and III for the aluminum compounds. A catalyst prepared from alkyl aluminum sesquichloride, such as methyl or ethyl aluminum sesquichloride and vanadium oxychloride is preferred in the ratio of 1 mole vanadium oxychloride per 5-300 moles of aluminum and more preferably 15-60 moles of aluminum, with 40 moles of aluminum per mole of vanadium yielding the best results.

The polymerization is preferably carried out on a continuous basis in a reaction vessel closed to the outside atmosphere, which is provided with an agitator, cooling means and conduit means for continuously supplying the ingredients of the reaction including monomer, catalyst and accelerators and conduit means for continuously withdrawing solution containing elastomer. The polymerization is carried out in a liquid phase in the organic solvent in the presence of a Ziegler catalyst. The solution of elastomer in the polymerization solvent is withdrawn continuously from the reaction vessel, the catalyst is killed by the addition of a catalyst deactivator. When expressed on the basis of RSV, withdrawal is carried out when the desired molecular weight has been reached, such as a polymer having an RSV within the range of 0.4-5.0 and preferably 1.5-3.0. RSV is the reduced solution viscosity of a 0.1 percent solution in decalin at 135° C.

As the component reacted onto the EPM rubbery copolymer, it is preferred to make use of maleic anhydride but other unsaturated dicarboxylic acid anhydrides or acids may be used having the general formula

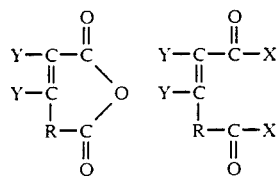

in which R is an alkylene group having from 0-4 carbon atoms and Y is preferably hydrogen but may be an organic group such as a branched or straight chain alkyl group, an anhydride, ketone, heterocyclic or other organic group of 1-12 carbon atoms, a halogen group such as chlorine, bromine, or iodine and in which at least one, and preferably both of the X groups are hydroxyl but in which one of the X groups may be an ester forming group such as an alkoxy or aryloxy group having from 1-8 carbon atoms.

For example, the maleic anhydride in the following examples may be substituted in whole or in part with equal molecular equivalents of other unsaturated dicarboxylic acids or anhydrides, such as itaconic acid or anhydride, fumaric acid, maleic acid and the like.

The reaction is carried out in the presence of a peroxide catalyst such as dicumyl peroxide, t-butyl hydroperoxide, benzoyl peroxide, t-butylperoctanoate, di-t-butylperoxide, t-butylhydroperoxide, cumene hyroperoxide, t-butylperbenzoate, 2,5-dimethyl-2,5-di(t-butylperoxy) hexane, or other free radical sources capable of hydrogen abstraction, as represented by alkyl peroxy esters, alkyl peroxides, alkyl hydroperoxides, diacyl peroxides and the like, which is added with the EPM, reactive agent and polyamide, in bulk, to the reaction chamber.

The desired results are achieved when the amount of anhydride or diacid reacted, at least in part, by way of a grafting reaction onto the EPM polymer is within the range of 0.2-5 percent by weight of the base polymer and preferably in an amount within the range of 0.5-4 percent by weight. In general, the amount reacted onto the polymer will represent only about 30-80 percent of the material introduced into the reaction.

An EPDM rubber component, formed by interpolymerization of ethylene, one or more mono-olefins having 3-16 carbon atoms (and preferably propylene) and one or more polyenes, can be substituted for the EPM component of this invention when low temperature notch sensitivity (at temperatures below 0° C.) is not critical.

In the preparation of the EPDM interpolymer rubber, the polyene monomer containing a plurality of carbon-to-carbon double bonds may be selected from those disclosed in the prior art for use as third monomers in the preparation of ethylene-mono-olefinpolyene terpolymers, including open chain polyunsaturated hydrocarbons containing 4-20 carbon atoms, such as 1,4-hexadiene, monocyclic polyenes and polycyclic polyenes. The polyunsaturated bridged ring hydrocarbons or halogenated bridged ring hydrocarbons are preferred. Examples of such bridged ring hydrocarbons include the polyunsaturated derivatives of bicyclo(2,2,1) heptane wherein at least one double bond is present in one of the bridged rings, such as dicyclopentadiene, bicyclo(2,2,1)hepta-2,5-diene, the alkylidene norbornenes, and especially the 5-alkylidene-2-norbornenes wherein the alkylidene group contains 1-20 carbon atoms and preferably 1-8 carbon atoms, the alkenyl norbornenes, and especially the 5-alkenyl-2-norbornenes wherein the alkenyl group contains about 3-20 carbon atoms and preferably 3-10 carbon atoms. Other bridged ring hydrocarbons include polyunsaturated derivatives of bicyclo(2,2,2) octane as represented by bicyclo(3,2,1) octane, polyunsaturated derivatives of bicyclo(3,3,1) nonane, and polyunsaturated derivatives of bicyclo(3,2,2) nonane.

Specific examples of preferred bridged ring compounds include 5-methylene-2-norbornene, 5-ethylidene-2-norbornene, 5-n-propylidene-2-norbornene, 5-isobutylidene-2-norbornene, 5-n-butylidene-2-norbornene, dicylopenta-dienes; the methyl butenyl norbornenes such as 5-(2-methyl-2-butenyl)-2-norbornene or 5-(3-methyl-2-butenyl)-norbornene, and 5-(3,5-dimethyl-4-hexenyl)-2-norbornene.

The EPDM backbone rubber may contain chemically bound therein molar ratios of ethylene to propylene or other $C_3-C_{16}$ mono-olefin varying between 95:10 to 5:90 ethylene: propylene, and preferably between 70:30 to 55:45 ethylene: propylene. The polyene or substituted polyene may be chemically bound therein in an amount of 0.1 to 10 mole percent, and preferably 0.3 to 10 mole percent. The level of unsaturation in the backbone rubber may range from 0-20 double bonds per 1,000 carbon atoms in the polymer chain.

The interpolymerization is carried out in the presence of a Ziegler catalyst of the type heretofore described.

The preparation of EPM and EPDM polymers is well known and is fully described in such patents as U.S. Pat. Nos. 2,933,480, 3,093,621, 3,211,709, 3,646,168, 3,790,519, 3,884,993, 3,894,999 and 4,059,654, amongst many others.

As the ester of a methacrylic acid which has an epoxide functionality on the alkoxy portion, it is preferred to make use of glycidyl methacrylate, although other epoxy compounds having the following general formula may be used:

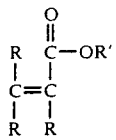

in which R' is an organic group having an epoxide functionality and R is hydrogen, methyl, ethyl, propyl or other alkyl, aralkyl, cyclic, or aromatic group. Representative of such other modifying agents are glycidyl acrylate, glycidyl 2-ethylacrylate, glycidyl 2-propylacrylate and the like.

The desired results are achieved when the amount of epoxide component charged is within the range of 2-15 parts by weight per 100 parts by weight of the backbone rubber.

A free radical initiator, such as dialkyl peroxide may be used to promote the graft reaction. Such initiator is generally used in an amount within the range of 1-5 parts by weight per 100 parts by weight of the EPM or EPDM rubber, and preferably in an amount within the range of 1-2 percent by weight of the rubber.

The grafting reaction may be carried out in solvent solution with the rubber backbone present in a concentration which may range from 10-30 percent by weight, with constant stirring, at an elevated temperature within the range of 125°-200° C. for a time ranging from ½ to 2 hours. The reaction condition can be varied depending somewhat upon the type and amount of catalyst and temperature conditions, as is well known to those skilled in the art. Where high amounts of graft monomer are to be attached to the backbone rubber, it has been found to be advantageous to carry out the graft reaction in the melt state of the backbone rubber, i.e. extruder grafting. This process is simply performed by feeding the backbone rubber, an excess of graft monomer, and an appropriate catalyst to a melt extruder and mixing and reacting the feed components at an elevated temperature.

The reactive polystyrene is characterized by cyclic iminoether groups, and preferably oxazoline groups attached to the polymer chain as represented by the following structural formula.

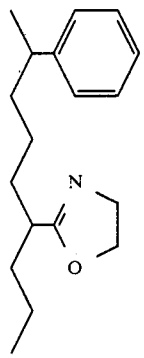

Such activating groups are capable of co-reaction with carboxyl, anhydride, epoxy, amine, aldehyde and isocyanate groups, which include groups within the grafted rubber thereby to enhance the blending or compatibility between the grafted rubber and matrix resin. For a more detailed description of reactive polystyrenes capable of being employed in the practice of the invention and a method of manufacture, reference may be made to U.S. Pat. No. 4,590,241.

It is believed that the improvements are derived from the unique structure and physical properties of the modifier due to a chemical reaction between the oxazoline group on the reactive polystyrene and the grafted rubber providing crystalline sites within the amorphous rubber when the modifier is subsequently blended with the matrix resin, as by means of an extruder, bamburg, hot rolling mill or the like melt processing equipment. The desired results can be achieved in a one-step process wherein the matrix resin, reactive polystyrene and grafted rubber are separately added for blending in an extruder or other melt processing equipment. However, when the matrix resin contains amine or hydroxy functionalities, capable of reaction with the reactive rubber or reactive polystyrene a two step process is preferred.

Suitable polycarbonate resin for use herein may be prepared by reacting a dihydric phenol with a carbonate precursor, such as phosgene, haloformate or a carbonate ester. Typically, such polycarbonate will have recurring structural units of the formula:

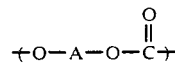

wherein A is a divalent aromatic radical of the dihydric phenol employed in the polymer producing reaction. Preferably, the aromatic carbonate polymers have an intrinsic viscosity ranging from 0.30 to 1.0 dl./g (measured in methylene chloride at 25° C.). By dihydric phenols is meant mononuclear or polynuclear aromatic compounds containing two hydroxy radicals, each of which is attached to a carbon atom of an aromatic nucleus. Typical dihydric phenols are bisphenols joined by an alkylene radical, an ether link, or a sulfur link. Preferred bisphenols include 2,2-bis-(4-hydroxphenyl)propane; 2,2-bis-(3,5-dimethyl-4-hydroxphenyl)propane; 4,4'-dihydroxy-diphenyl ether; bis(2-hydroxyphenyl)methane; mixtures thereof and the like. The preferred aromatic carbonate polymer for use herein is a homopolymer derived form 2,2-bis(4-hydroxyphenyl)propane, i.e., bisphenol-A. Polycarbonates suitable for use herein, including methods of polymerization, and a further disclosure of monomer constituents, are described in U.S. Pat. Nos. 2,999,835; 3,028,365; 3,334,154; 4,131,575; 4,018,750; and 4,123,436 which are incorporated herein by reference.

Also suitable for use herein are the polyphenylene ether compounds. Such compounds are generally produced by the oxidative coupling of phenol compounds by oxygen or oxygen-containing gas in the presence of a catalyst to produce homopolymers and copolymers of, for example, poly(2,6-diphenyl-1,4-phenylene)ether; poly(2,6-dimethoxy-1,4-phenylene)ether; poly(2,6-dichloro-1,4-phenylene)ether; and the like. An especially preferred family of polyphenylene ethers include homopolymers and copolymers of those have a $C_1$ to $C_4$ alkyl substitution in the two positions ortho to the oxygen ether atom. Illustrative members of this class are poly(2,6-dimethyl-1,4-phenylene)ether; poly(2,6-diethyl-1,4-phenylene)ether; poly(2,6-dipropyl-1,4-phenylene)ether; poly(2-ethyl-6-propyl-1,4-phenylene)ether; and the like. The most preferred polyphenylene ether is poly(2,6-dimethyl-1,4-phenylene)ether.

Polyphenylene ethers are well known in the art and may be prepared by any number of catalytic and non-catalytic processes from corresponding phenols or reactive derivatives thereof. Examples of polyphenylene ethers and methods for their production are disclosed in U.S. Pat. Nos. 3,306,874; 3,306,875; 3,257,357; 3,257,358; 3,337,501 and 3,787,361; all incorporated herein by reference.

The polystyrene and acrylic resins, well known to the skilled in the art, are benefitted similarly by blending with modifiers of the types described in which a reactive polystyrene is reacted with a grafted rubber of the types described.

The thermoplastic modifier containing molding compositions of this invention may be used alone as molding pellets or mixed with other polymers, and may contain fillers such as glass fibers, mica, and the like, as well as pigments, dyes, stabilizers, plasticizers, and the like. One may readily determine which are necessary and suitable for a particular application.

Having described the basic concepts of the invention, illustration will now be made by way of the following examples.

EXAMPLE 1

Preparation of maleic anhydride graft of EPM rubber

A 2.75 RSV, 60/40 (molar ratio) ethylene-propylene EPM rubber (EP syn 7006, marketed by Copolymer Rubber and Chemical Corporation of Baton Rouge, La.) was fed with a screw feeder (of K-TRON CORPORATION) into a co-rotating twin screw extruder (Werner-Pfleiderer Corporation ZSK 30) (12 barrels) at a rate of 6.0 pounds per hour. The temperature was 200° C. in all zones. A solution containing maleic anhydride/acetone/2,5-dimethyl-2,5 di(t-butylperoxy) hexane (DBPH) in a wt/wt/wt ratio of 2/1/0.1 was fed at a rate of 0.224 pounds per hour. This rate corresponds to a maleic anhydride level of 2.4 parts by weight per 100 parts by weight of rubber (phr) and a DBPH level of 0.12 phr. Acetone and unreacted maleic anhydride were evaporated off by applying a vacuum through a vent in the barrel and subsequently condensed. The extrudate was cooled in a water bath and pelletized. The dried pellets had a degree of graft (DOG) of 1.7 percent and an RSV of 1.56. The RSV of the base rubber (EPM) and the grafted polymer rubber, were measured on 0.1% solution in decalin at 135° C.

The grafting reaction can be carried out in solvent solution as well as by bulk reaction as heretofore described.

EXAMPLE 2

Preparation of glycidyl methacrylate grafted EPDM rubber

One hundred parts by weight backbone rubber (2.2 RSV; 9 C=C per 1000 carbon atoms, 8 percent by weight 5-ethylidine-2-norbornene, ethylene/propylene ratio of 2/1, Mooney Viscosity=40, marketed by Copolymer Rubber and Chemical Corporation under the name EPSYN 4906); 0.1 parts by weight antioxidant (Irganox 1076 phenolic antioxidant Ciba Geigy Corporation) and 300 parts by weight hexane were charged to a one gallon Hastellog C reactor. The reactor was sealed, flushed with nitrogen and heated to 155° C. 2.5 parts by weight glycidyl methacrylate in 15 parts by weight hexane were pressured into the reactor, after which 2 parts by weight initiator (Hercules Di-Cup T free radical initiator) in 15 parts by weight hexane was added. The solution was stirred at 500-600 RPM for one hour at 155° C. and 200-250 psig. When the reaction mixture cooled down, the product was recovered by precipitation in acetone and dried. The grafted EPDM had 2.6 percent bound glycidyl/methacrylate (GMA), an RSV of 2.44 and was substantially gel free.

EXAMPLE 3

Conditions for preparation of the modifier and blends of modifier with a thermoplastic resin In the following examples, illustrating the practice of this invention, modifiers embodying the features of the invention, were prepared using 2-3 extrusions through a 1" single screw extruder (Killion) having an L/D ratio of 20/1. Temperatures used to prepare the modifier combinations of grafted rubber and reactive polystyrene, were 400° F. through the barrel and 350° F. at the die. The resulting air cooled strands were chopped into pellets.

Blends of thermoplastic polycarbonate resin and modifier were prepared using 2-3 extrusions through a 1" single screw extruder (Killion) having an L/D ratio of 20/1. Temperatures used for extrusion were 450° F. in the barrel and 425° F. at the die. The extruded strands were air cooled and chopped into pellets. The pellets were molded into test specimens for tensile and notched Izod impact strengths, using a plunger injection molder with a cavity temperature of 570°-615° F. and a mold temperature of 250°-315° F. The test specimens were stored in moisture proof polyethylene bags for at least 16 hours before testing.

The specimens were subjected to the following tests:
(1) Notched Izod impact strength was measured according to ASTM D256.
(2) Tensile strength was measured according to ASTM D638.
(3) Extrusion Plastometer flow rate was measured according to ASTM D1238.
(4) Flexural properties were measured according to ASTM D790.
(5) Blend quality ratings (BQR) were assigned on the basis of surface appearance and internal appearance (MWO-8-83, WGW-20-86).
(6) Unless otherwise stated the polycarbonate used was Lexan 141 (GE).
(7) The polyphenylene oxide (PPO) was obtained from General Electric Company in powder form and pelletized on the Werner-Pfleiderer using one extrusion.

EXAMPLE 4

An EPM containing modifier with polycarbonate

This example illustrates the combination of a modifier formed of a maleic anhydride grafted EPM and reactive polystyrene blended with thermoplastic polycarbonate matrix resin.

The total amount of modifier in the final blend was varied from 20% to 40%. The amount of reactive polystyrene in the final blend varied from 3% to 20%. The amount of grafted rubber in the blend varied from 10% to 20%

The room temperature notched Izod for these blends were 7.0 to 11.6 ft-lbs/inch. The low temperature notched Izod (−20° C.) were about 1 ft-lbs/inch lower than the values at room temperature. By comparison, the polycarbonate resin without modifier gave values of less than 2 ft-lbs/inch.

Blends formed of the polycarbonate resin and grafted rubber gave poor surface characteristics and poor internal appearance, characterized by a layered, plywood type structure. On the other hand with blends formed with the modifier combination which includes the reactive polystyrene with the grafted rubber, higher rubber loadings can be achieved with less degradation of internal and external appearance.

By way of a specific example, the modifier was prepared with 60 grams reactive polystyrene and 340 grams maleic anhydride grafted EPM (5006) containing a degree of graft of 0.64 percent.

Seventy grams of modifier were dry mixed with 280 grams polycarbonate resin, yielding a blend of 20% by weight modifier (3% reactive polystyrene and 17% rubber) and 80% polycarbonate The room temperature notched Izod was 9.4 ft-lbs/inch and the cold temperature notched Izod was 11.9. The blend quality rating (BQR) was good.

As an alternative, a one step bulk procedure was carried out in which 10.5 grams of reactive polystyrene, 59.5 grams of the above maleic anhydride grafted EPM and 280 grams of polycarbonate were premixed and extruded twice through the extruder at the described temperatures (450° F. in the barrel and 425° F. at the die). The room temperature notched Izod was 10.6 and the cold temperature notched Izod was 8.1 with superior blend qualities. Thus, with either a one step or two step procedure employing an EPM-containing modifier will yield superior low-temperature impact properties while maintaining the appearance qualities of the matrix resin.

EXAMPLE 5

An EPDM containing modifier with polycarbonate

This example illustrates the use of modifier formed of EPDM rubber grafted with glycidyl methacrylate and reactive polystyrene.

The total amount of modifier in the final blend was varied from 6%–40%. The amount of reactive polystyrene (RPS) in the final blend was varied from 0%–22.5%. The amount of grafted rubber in the final blend was varied from 2.5%–23.8%. The degree of graft of the rubber was varied from 1.5%–3%, but this had no significant effect on the final blend properties.

The room temperature Izod Impact (RTNI) values for these blends were 1.7–11.6 ft-lbs/inch. The −20° C. NI values were 1.4–3.6 ft-lbs/inch. The blend quality ratings were B3-A1.2, with most being A2 or higher. Blends rated ranged from 2.5/3.0–1.0/1.5 with 1.0/1.0 being perfect.

By way of a specific example, in a two step procedure, the modifier was prepared using 87.5 g of RPS and 262.5 g of glycidyl methacrylate grafted rubber having a degree of graft of 3.0%. The gel was 4.5% and the melt flow (F) 2.3 g/10 min.

Pellets of this modifier (35 g) were dry mixed with the polycarbonate (315 g) and extruded twice. This resulted in a blend consisting of 10% modifier (2.5% RPS, 7.5% rubber) and 90% polycarbonate. The RTNI was 9.1 ft-lbs/inch and the −20° C. NI was 3.2 f5-lbs/inch. The blend quality rating was A2.

Alternatively in the one-step procedure, 10.5 g of RPS, 59.5 g of EP55-g-3% GC, and 280 g of polycarbonate were premixed, then was extruded twice using the following settings: Zone 1 -405° F., Zone 2 - 450° F., Die - 425° F. The RTNI was 2.1 ft-lbs/inch. The blend quality rating was B3. As differentiated from the EPM in Example 3, EPDM containing modifiers do yield good retention of appearance properties, but the impract properties, particularly at low temperature, are not as significantly improved and the improvements are process dependent.

EXAMPLE 6

An EPM containing modifier with polyphenylene oxide

This example illustrates the use of a modifier formed of maleic anhydride grafted EPM rubber and reactive polystyrene blended with polyphenylene oxide (PPO) matrix resin.

The total amount of modifier in the final blend was varied from 20%–50%. The amount of reactive polystyrene (RPS) in the final blend was varied from 4%–25%. The amount of maleic anhydride grafted rubber in the final blend was varied from 10%–40%. The degree of graft (DOG) of the rubber was varied between 0.64% and 1.7%.

The RTNI values for these blends were 3.8–6.6 ft-lbs/inch. The −20° C. notched Izod values were 2.4–5.3 ft-lbs/inch. As a group these values for notched Izod are higher than the blends based on the maleic anhydride rubber modifier without the reactive polystyrene. These blends had blend quality ratings of 7/7–1.2/3, where 1/1 is best and 7/7 is worst. Blends of grafted rubber without the reactive polystyrene showed poor surface and internal appearance characterized by streaking and a layered plywood structure. Blends of modifier, reactive styrene and grafted rubber, even at high modifier loadings, showed little degradation in appearance.

A specific example: the modifier was prepared using 175 g of reactive polystyrene (RPS) and 175 g of maleic anhydride grafted EPM rubber (EP 5006) with a DOG of 0.64. Pellets of this modifier (175 g) were dry mixed with the PPO (175 g) and extruded twice. This resulted in a blend consisting of 50% modifier (25% RPS, 25% rubber) and 50% PPO. The room temperature notched Izod (RTNI) was 4.4 ft-lbs/inch, and the −20° C. notched Izod (NI was 2.5 ft-lbs/inch. The blend quality rating was 2/4.

EXAMPLE 7

An EPDM containing modifier with polyphenylene oxide

This example illustrates the use of a modifier system of glycidyl methacrylate grafted EPDM rubber and reactive polystyrene blended with polyphenylene oxide matrix resin.

The total amount of modifier in the final blend was varied from 5.8%–40%. The amount of RPS in the final blend was varied from 0%–30%. The amount of glycidyl methacrylate grafted rubber in the final blend was varied from 4.1%–23.8%.

The RTNI values for these blends were 1.2–6.9 ft-lbs/inch. The −20° C. NI values were 1.5–3.8 ft-lbs/inch. Comparable blends using 10%–50% polystyrene or high impact polystyrene had RTNI values of 0.2–0.47 ft-lbs/inch or 1.02–1.25 ft-lbs/inch, respectively.

As with polycarbonate, loading these amounts of rubber into PPO blends results in poor surface characterized by a streaked appearance, and poor internal appearance characterized by a layered, plywood type of structure. By using the modifier, rubber can be added with less resulting degradation of appearance. These blends had blend quality ratings of 6/5-1/2.5 where 1/1 is best and 7/7 is worst.

A specific example: the modifier was prepared using 30 g of RPS and 270 g of glycidyl methacrylate EPDM rubber having a degree of graft of 3%. Pellets of this modifier (90 g) were dry mixed with the PPO (210 g) and extruded twice. This resulted in a blend consisting of 30% modifier (3% RPS, 27% rubber) and 10% PPO. The RTNI was 6.0 ft-lbs/inch and the $-20°$ C. NI was 2.8 ftlbs/inch. The blend quality rating was 3/4.

Similar improvements were experienced when polystyrene matrix resins were substituted for the polycarbonate or polyphenylene oxide matrix resin in the foregoing examples.

The levels of appearance and break can be predictably influenced by the ratio of modifier and components making up the modifier for each specific type of thermoplastic resin. For example, higher surface gloss can be achieved for a given modifier level by decreasing the level of rubber or, conversely, increasing the reactive polystyrene level. A matte finish can be had by increasing the proportion of the rubber component in the modifier. The exact relationship between the variables is specific to each type of thermoplastic matrix.

For a prescribed level of modifier, higher room temperature notched impact strength (RTNI) and low temperature notched impact strength (LTNI) values are achieved by increasing the level of the grafted rubber component in the modifier. Either EPM or EPDM containing modifiers work in this invention; however, superior low-temperature properties were obtained with EPM. In addition, the EPM containing modifier will perform equally well in a one or two step process.

It will be understood that changes may be made in the details of the formulations and processing characteristics, without departing from the spirit of the invention, especially as defined by the following claims.

What is claimed is:

1. A modifier composition for blending with a thermoplastic resin to improve its low temperature impact strength without altering substantially the appearance and surface characteristics of the molded thermoplastic resin consisting essentially of the reaction product of (a) 25-90 parts by weight of an EPM or EPDM rubber grafted with (1) an epoxy functional alpha-beta ethylenically unsaturated hydrocarbon or (2) an alpha-beta unsaturated dicarboxylic acid or anhydride reacted with (b) 10-75 parts by weight of a reactive polystyrene having cyclic iminoether groups attached to the polystyrene polymer chain.

2. The modifier composition as claimed in claim 1 wherein the rubber is an EPDM rubber grafted with an epoxy functional ethylenically unsaturated hydrocarbon.

3. The modifier composition as claimed in claim 1 wherein the rubber is an EPM rubber which has been grafted with an unsaturated dicarboxylic acid or anhydride.

4. The modifier composition as claimed in claim 1 wherein the rubber is an EPDM rubber which has been grafted with glycidyl acrylate or glycidyl methacrylate.

5. The modifier composition as claimed in claim 1 wherein the rubber is grafted with maleic anhydride.

6. The modifier composition as claimed in claim 1 wherein the EPM rubber is a copolymer of ethylene and one or more $C_3$-$C_{16}$ mono-olefins.

7. The modifier composition as claimed in claim 1 wherein the rubber is an EPM rubber and is a copolymer of 10-90 moles of ethylene and 90-5 moles of propylene.

8. The modifier composition as claimed in claim 1 wherein the rubber is an EPDM rubber and is an interpolymer of ethylene, a $C_3$-$C_{16}$ mono-olefin and a polyene.

9. The modifier composition as claimed in claim 1 wherein the rubber is an EPDM rubber which is an interpolymer of 95-10 parts by weight of ethylene, 5-90 parts by weight of propylene and 0.1-10 parts by weight of 5-ethylidene-2-norbornene.

10. The modifier composition as claimed in claim 1 wherein the cyclic iminoether groups attached to the polymer chain of the reactive polystyrene are oxazoline groups.

11. A method for making the modifier composition as defined in claim 1 which comprises blending (a) 25 to 90 parts by weight of an EPM or EPDM rubber grafted with (1) an alpha-beta unsaturated dicarboxylic acid or anhydride or (2) an epoxy functional alpha-beta ethylenically unsaturated hydrocarbon with (b) 10 to 75 parts by weight of a reactive polystyrene having cyclic iminoether groups attached to the polystyrene polymer chain.

12. A method as claimed in claim 11 wherein the cyclic iminoether groups attached to the polymer chain of the reactive polystyrene are oxazoline groups.

13. A method as claimed in claim 11 wherein the rubber is an EPM rubber.

* * * * *